US012595376B2

(12) United States Patent
Jung et al.

(10) Patent No.: US 12,595,376 B2
(45) **Date of Patent: *Apr. 7, 2026**

(54) COATINGS

(71) Applicant: JOTUN AS, Sandefjord (NO)

(72) Inventors: Ku-sik Jung, Sandefjord (NO); Hyun-ho Shin, Sandefjord (NO); Erik Risberg, Sandefjord (NO)

(73) Assignee: JOTUN AS, Sandefjord (NO)

( * ) Notice: Subject to any disclaimer, the term of this patent is extended or adjusted under 35 U.S.C. 154(b) by 696 days.

This patent is subject to a terminal disclaimer.

(21) Appl. No.: 17/650,673

(22) Filed: Feb. 11, 2022

(65) Prior Publication Data

US 2022/0162454 A1 May 26, 2022

Related U.S. Application Data

(63) Continuation-in-part of application No. 16/330,853, filed as application No. PCT/EP2017/072662 on Sep. 8, 2017, now Pat. No. 11,279,834.

(30) Foreign Application Priority Data

Sep. 8, 2016 (EP) .................................... 16187921

(51) Int. Cl.

| | |
|---|---|
| ***B32B 15/092*** | (2006.01) |
| ***B32B 27/38*** | (2006.01) |
| ***C08G 59/24*** | (2006.01) |
| ***C08G 59/50*** | (2006.01) |
| ***C09D 5/00*** | (2006.01) |
| ***C09D 163/00*** | (2006.01) |

(52) U.S. Cl.
CPC .......... *C09D 5/002* (2013.01); *C09D 163/00* (2013.01)

(58) Field of Classification Search
USPC .......................... 428/416, 418; 523/427, 428
See application file for complete search history.

(56) References Cited

U.S. PATENT DOCUMENTS

| | | | | |
|---|---|---|---|---|
| 4,791,214 | A | 12/1988 | Mori et al. | |
| 5,229,438 | A | 7/1993 | Ishida et al. | |
| 5,397,645 | A | 3/1995 | Varma et al. | |
| 5,939,514 | A | 8/1999 | Brown et al. | |
| 11,279,834 | B2 * | 3/2022 | Jung ....................... | C09D 7/65 |
| 2004/0222532 | A1 | 11/2004 | Zeng | |
| 2006/0148977 | A1 | 7/2006 | Finnie | |
| 2009/0042036 | A1 | 2/2009 | Kato | |
| 2009/0148610 | A1 | 6/2009 | Nishimori et al. | |
| 2009/0226729 | A1 | 9/2009 | Niimoto et al. | |
| 2010/0297357 | A1 | 11/2010 | Mowrer et al. | |
| 2012/0214908 | A1 | 8/2012 | Tan | |
| 2016/0083338 | A1 | 3/2016 | Minnich et al. | |

FOREIGN PATENT DOCUMENTS

| | | | |
|---|---|---|---|
| CN | 102010646 | A | 4/2011 |
| CN | 102863873 | A | 1/2013 |
| CN | 105001772 | A | 10/2015 |
| CN | 105440880 | A | 3/2016 |
| EP | 1081205 | A1 | 3/2001 |
| EP | 1788048 | A1 | 5/2007 |
| JP | S63184701 | A | 7/1988 |
| JP | H03232574 | | 10/1991 |
| JP | 1994-248053 | A2 | 9/1994 |
| JP | H08252516 | A | 10/1996 |
| JP | 1998-168147 | A2 | 6/1998 |
| JP | H11193504 | A | 7/1999 |
| JP | 2001-152085 | A2 | 6/2001 |
| JP | 20020080563 | | 7/2002 |
| JP | 2003-119234 | A2 | 4/2003 |
| JP | 2005-015572 | A2 | 1/2005 |
| JP | 2005-187683 | A2 | 7/2005 |
| JP | 2006-198984 | A2 | 8/2006 |
| JP | 2007-297610 | A2 | 11/2007 |
| JP | 5302059 | B2 | 10/2013 |
| JP | 5913762 | B1 | 4/2016 |
| JP | 2016-194045 | A2 | 11/2016 |
| JP | 2017-132960 | A2 | 8/2017 |
| JP | 3227315 | U | 8/2020 |
| JP | 7508407 | B2 | 7/2024 |
| KR | 970007339 | U | 2/1997 |
| KR | 10-1046264 | B1 | 7/2011 |
| KR | 20110118046 | A | 10/2011 |

(Continued)

OTHER PUBLICATIONS

Machine translation of CN-102863873-A (no date).*
Trends in container ship enlargement (publication date/month: daily CAR GO Jun. 2016).
Inomata, "Improvement of coating workability of non solvent type epoxy resin coat for ship tanks and its measurement evaluation," Coating Research, vol. 148 (Sep. 2007).
Regarding coating work in the shipbuilding industry (Japan Shipbuilding Industry Association, Sep. 28, 2004).
Series of Knowing Things From Today Very Easy Basics of Coatings (1st edition published on Apr. 15, 2008).
Basic Lecture on Printing Ink (Lecture V) "Public Gravure and Packaging Gravure Ink," Color Material, 70 [5] (1997).

(Continued)

*Primary Examiner* — Michael J Feely
(74) *Attorney, Agent, or Firm* — Thomas | Horstemeyer, LLP

(57) ABSTRACT

An ultra-high solids content primer coating composition comprising:
(i) 5.0 to 50 wt % of at least one bisphenol F epoxy resin;
(ii) 1.5 to 12 wt % of at least one silane;
(iii) 0 to 20 wt % of at least one hydrocarbon resin;
(iv) 0 to 15 wt % of at least one reactive diluent;
(v) at least one curing agent;
wherein said composition has a solids content of at least 90 wt % according to ASTM D5201-05;
wherein said composition has a viscosity of 200 to 800 cps at 23° C. and 50% RH (ASTM D4287);
and wherein the ratio between hydrogen equivalents in the curing agent and epoxy equivalents of the coating composition is in the range 50:100 to 120:100.

23 Claims, No Drawings

(56) References Cited

FOREIGN PATENT DOCUMENTS

| | | | |
|---|---|---|---|
| KR | 10-2015-0097596 | A | 8/2015 |
| KR | 102407670 | B1 | 6/2022 |
| RU | 290421 | | 12/2006 |
| WO | 20080125610 | | 10/2008 |
| WO | 2015049260 | A1 | 4/2015 |
| WO | 2015165808 | A1 | 11/2015 |
| WO | 2017138168 | A1 | 8/2017 |
| WO | 2017146193 | A1 | 8/2017 |
| WO | 2018046702 | B2 | 3/2018 |

OTHER PUBLICATIONS

Tsuchiya Masako, Regarding Viscosity Changes of Synthetic Polymer Solutions by Adding Pigments, Journal of the Color Materials Association, 1955, vol. 28, No. 2, p. 54-56, published on Nov. 20, 2012.
Cardolite NC 513 Technical Data Sheet (published in Jun. 2004).
About the current status and future prospects of epoxy resin reactive diluents and new modified amine curing agents, ecture summary (published on Jan. 16, 1992).
Cardolite® Lite 2513HP Reactive Diluent for Epoxy Resins Technical Datasheet (published in Mar. 2009).
ERISYS® GE 8 Technical Data Sheet (published on Nov. 24, 2008).
NOVARES® and RUETASOLV® for the coating Industry (published in Mar. 2013).
Affidavit 1—Seongwoon Min.
Affidavit 2—Seongwoon Min.
Affidavit—Douglas Beaumont.
Marrion, Alastair. (2004). The Chemistry and Physics of Coatings /. 10.1039/9781847558206.
Effects of reactive diluents type on chemical structure and property of epoxy resin system; Li et al; Journal of Hebei University (Natural Science Edition), 36(6), Jul. 6, 2016.
Ozeren,Eren. (2015). Effects of Epoxy Resin and Hardener Type on Durability and Mechanical Properties of Epoxy Mixes oai:polen.itu.edu.tr:11527/10263.
Li et al., J.Chem.Pharm.Res., 2014, 6(7):2466-2469.
Hare, Clive H.. "Protective Coatings: Fundamentals of Chemistry and Composition." (1994).
Enviroline™ 2960 details of product SDS (Part A and B) and TDS (2015).
Wikipedia contributors. (Mar. 13, 2024). Benzyl alcohol. In Wikipedia, The Free Encyclopedia. Retrieved 15:34, Jul. 3, 2024, from https://en.wikipedia.org/w/index.php?title=Benzyl_alcohol&oldid=1213537316.
Wikipedia contributors. (Dec. 6, 2023). Methyl isobutyl ketone. In Wikipedia, The Free Encyclopedia. Retrieved 15:43, Jul. 3, 2024, from https://en.wikipedia.org/w/index.php?title=Methyl_isobutyl_ketone&oldid=1188609345.
Wikipedia contributors. (Mar. 28, 2024). 1,2,4-Trimethylbenzene. In Wikipedia, The Free Encyclopedia. Retrieved 15:46, Jul. 3, 2024, from https://en.wikipedia.org/w/index.php?title=1,2,4-Trimethylbenzene&oldid=1216042538.
Pritchard, Geoffrey. Plastics additives: an AZ reference. vol. 1. Springer Science & Business Media (Diluents and viscosity modifiers for epoxy resins), 2012.
Epodil® Reactive Diluents, brochure from Evonik Corporation, May 2017.
Univar Safety Data Sheet Ancamine 2264 Curring Agent Mar. 2015.
Momentive Technical Data Sheet on Silquest A-187 Oct. 2021.
Effect of Xylene Formaldehyde Resins on Epoxy Resin Adhesive, The Journal of Adhesion vol. 2, No. 1, Mar. 4, 2008.
Olin Technical Data Sheet on D.E.R™ 354.
Aldrich, Sigma (3-Glycidyloxypropyl)trimethoxysilane for synethsis, hllps://al.vwr.com/slore/product/en/2379090/3-glycidoxypropyl-trimethoxysilan-zur-synthese-sigma-aldrich# (May 28, 2024).
ASTM D4287 "Standard Test Method for High-Shear Viscosity Usinga Cone/Plate Viscometer".
Optimum viscosity for paint application—American Coatings Association. (Nov. 19, 2019). American Coatings Association. https://www.paint.org/coatingstech-magazine/articles/optimum-viscosity-paint-application/.
Reactive Thinner, Wikipedia (Feb. 13, 2023); https://de.wikipedia.org/wiki/Reaktivverd%C3%BCnner#:~:text=Reaktivverd%C3%BCnner%20sind%20Stoffe%2C%20welche%20die,Copolymerisation%20Teil%20des%20Lackes%20werden.&text=Verd%C3%BCnner%20werden%20einem%20Lack%20zur,sie%20zur%20Herabsetzung%20der%20Viskosit%C3%A4t.
Protective Coaling Fundamentals of Chemistry and Composition, Clive H. Hare, 1994, pp. 194-195.
Huijun et al., Research and Progress of High Solid Epoxy Corrosion Resistant Coaling for the Marine., Materials, China., Jan. 2014., pp. 20-25, 31., vol. 33—No. 1., China Academic Journal Electronic Publishing House, http://www.cnki.nel., China.
Xiaojun et al., Study on Thick Film Wearable Solvent—Free Epoxy Anticorrosive Coatings., Paint & Coatings Industry., Jul. 2008., pp. 60-62., vol. 38—No. 7., China Academic Journal Electronic Publishing House, http://www.cnki.net., China.
JP Office Action mailed Jul. 30, 2020 in JP Application No. 2019-512985.
Kukdo Chemical, "YDF-170/175: Bisphenol F type Epoxy," 2004, 1pp.
International Search Report and Written Opinion for PCT/EP2017/072662 mailed Jan. 5, 2018, 2pp.
Araldite GY 282 Data Sheet.
Dow, "Epoxy Novolac Resins—High-Temperature, High-Performance Epoxy Resins".
Nova 5000 Technical Datasheet, China Paint Co., Ltd. (publication month: Dec. 2005).
Epoxy Curing Agents and Diluents, Product Guide, (Air Products Chemicals, Inc., 1998 Printed in Japan).
Ller, B. M., & Poth, U. (2011). Coatings formulation: An International Textbook.
Shin-Etsu Silicone: Silane Coupling Agents.
HELOXY Modifier 65 Technical Data Sheet.
Durig, John. (2000). Comparisons of epoxy technology for protective coatings and linings in wastewater facilities. 17. 49-54.
CVC Specialty Chemical, Inc Advantages of Higher Functionality in Formulated Epoxies for Chemical-Resistant Applications.
Wicks, Z. W., Jones, F. N., & Pappas, S. P. (1994). Organic Coatings Science and Technology. Chemical & Engineering News, 72(37), 56. https://doi.org/10.1021/cen-v072n037.p056.
Kakiuchi Hiroshi the Japan Society of Epoxy Resin Technology vol. 15 No. 3 (1994).
Toshihiko Nakamichi (and one other author), "Tokoton Yassashii Toryo No Hon (Book for Coating)", p. 50-51, First edition, First printing, 2008, First edition, 17th printing, Sep. 30, 2021—original and machine translation attached.
Toshikatsu Kobayashi, "Wakaru" Tsukaeru!Toryo Nyumon (book for Coating for beginners), p. 10-11, First edition, First printing, Aug. 30.
Japanese Standards Association, JIS Handbook 30 "Toryo (Coating) (2007)", p. 76.
https://corporate.evonik.jp/region/japan/downloads/dynasylan 'Dynasylan GLYMO7.
Cardolite Lite 2513HP Epoxy Reactive Diluent Technical DatasheetB, Cardolite Corporation,2007.
Measurement report, Hideko Seiki Co. Technical Centre, Sep. 27, 2021.
Amicure® PACM Curing Agent, Evonik Coporation, Jun. 2017.
Amicure PACM SDS (Nov. 18, 2010, Air Products).
Ancamine 2280 SDS (Dec. 24, 2010, Air Products).
Lecture "Molding Materials" (24)—Epoxy Resin; Yoshio Sato and Tamotsu Murata; vol. 15, No. 3, pp. 199-207, Mar. 2, 2003.
Airless application of exterior/anticorrosive paint.
Cargo hold/ Airless painting of anti-corrosion paint.
Current status and future direction of domestic ports Jan. 2019 Sumitomo Mitsui Banking Corporation.
Regarding the Enforcement of the law that partially amends the Air Pollution Control Act (Notice), Kankan University Departure No. 050617001, Jun. 17, 2025.

(56) References Cited

OTHER PUBLICATIONS

Voluntary Efforts to Reduce Volatile Organic Compound (VOC) Emissions (Japanese version) (Mar. 2017)—original pdf attached, along with translations.
Epoxy Resin, vol. 1 Basics, The Japan Society of Epoxy Resin Technology, Nov. 19, 2005, p. 122-123.
JIS General test methods for paints—Part 2: properties.
Silane coupling agent, Shin-Etsu Chemical Co Ltd, 2015, https://web.achive.org/web/20151006004226/http://www.silicone.jp:800/products/type/silanecoup/index.shtml accessed nDec. 28, 2024 15:46.
Paint Additive 2001, Kyoeisha Chemical Co., Ltd.
BYK Coating and Ink Additives, BYK Japan Co., Ltd. 2015.05.
Recent Development of Epoxy Resin Hardener, Hiroshi Kakiuchi, May 31, 1994, p. 42.
Japanese Office Action for Japanese Application 2024-098880 mailed May 8, 2025.
D19: Eiho Seiki Co., Ltd. Technical Center, Measurement Report, Sep. 29, 2021.
D32: Evonik Industries, description of Dynasylan (R) Glymo, Oct. 7, 2015.
Notice of Reasons for Revocation mailed Aug. 5, 2025 for Japanese Application patent No. 7508407.
ANCAMINE 2738 TDS, Jan. 25, 2022 (D56).
ANCAMINE 2280 TDS, Mar. 21, 2022 (D55).
Blanc Fixe N Sds Dec. 2020 (D54).
Finntalc M40 Tds, Dec. 2019 (D53).
BAYFERROX 3920 TDS Feb. 2024 (D52).
Araldite DY-H Information by Special Chem, Sep. 26, 2023 (D51).
EPIKOTE Resin 828 TDS Generated Date Jan. 13, 2025 (D50).
Efka PB 2725 TDS May 2022 (D49).
Crayvallc Ultra Product Sheet, Jun. 2022) (D48).
Tiona 826 Product Data Sheet (D47) (No. Date).
EPIKOTETM Resin 862 TDS Generated Jan. 13, 2025 (D46).
Datasheet of 1,6-hexanediol diglycidyl ether (D45) (No. Date).
“Choosing the Right Liquid Spray Technology”, by Graco Inc. (D44) (No. Date).
Silquest A-187 Sds (2022) (D43).
Evonik epoxy curing agents Nov. 2024 (D38).
TDS Isophorone diamine Jun. 1999 (D37).
Epodil LV5 Hydrocarbon Resin Jan. 25, 2022 (D35).
Fine Chemical Formulation Technology, Zhang Guanghua - 1999 (D34).
Enviroline 2960 (Feb. 5, 2015) (D10d).
Chapter 3 of Eren Ozeren M.Sc. Thesis, 11.11.2015 (D6b).
Enviroline 2960 Brochure, Mar. 2015 (D10g).
Enviroline_2960 White Parte A MSDS from Feb. 2012 (D10f).
Enviroline_2960 Curing agent MSDS from Feb. 2012 (D10e).

* cited by examiner

COATINGS

CROSS REFERENCE TO RELATED APPLICATIONS

This application is a continuation-in-part application of U.S. nonprovisional application Ser. No. 16/330,853 filed on Mar. 6, 2019, which is a US national phase application of international application no. PCT/EP2017/072662 filed on Sep. 8, 2017, which claims priority upon EP application no. 16187921.8 filed on Sep. 8, 2016. These applications are hereby incorporated by reference in their entirety.

FIELD OF THE INVENTION

This invention relates to a low solvent or solvent free epoxy primer coating composition that can be applied by conventional airless spray equipment to provide a fast curing anti-corrosive primer layer on a substrate. In particular, the primer can be a universal primer and can be applied in a single coat without the need for overcoating.

In order to provide a coating composition capable of airless spraying and having exceptionally low solvent content, the invention requires the combination of a bisphenol F epoxy resin with a certain content of silane crosslinking agent and preferably a reactive diluent and a hydrocarbon resin.

BACKGROUND OF INVENTION

In conventional painting of ships, various parts of a ship are individually coated with anticorrosive paints. A ship is built by manufacturing individual blocks and assembling them, so that the painting work needs to be carried out for each block before assembly.

A universal primer (single layer primer) typically having excellent weather resistance, adhesion to various finish coatings and anticorrosive properties is used to coat the blocks (which are previously subjected to surface treatment). This makes the painting process simple and minimises waste.

Known universal primers include those based on an epoxy resin, a vinyl chloride-based copolymer and a curing agent (JP211464/1998). This coating composition, however, uses a solid epoxy resin and a solid amine-based curing agent and hence requires large amounts of solvent. It is generally preferably to reduce solvent content for safety, economic and environmental reasons. A high solids universal primer is therefore sought.

As a high-solids epoxy-based anticorrosive paint that solves the above problems, there has been developed an anticorrosive coating composition comprising a main agent component containing a liquid epoxy resin of bisphenol A type and an amine-based curing agent that uses aliphatic polyamine, alicyclic polyamine, aromatic polyamine, polyamide and the like singly or in combination (for example, JP80563/2002). This high-solids anticorrosion paint has a solids content of about 80% by weight and has a solvent content of about 20% by weight.

EP-A-1788048 describes a high-solids anticorrosive coating composition that cures rapidly. Whilst the document refers to a high solid content of up to 100% many of the examples contain significant amounts of solvent such as benzyl alcohol which under new legislation is considered to contribute to VOC. The coatings of the present invention have lower VOC and can be applied with conventional airless spray equipment with a useful pot life of 1.5 hrs or more. The high solids examples 16-18 have very poor pot life, possibly due to the excessive viscosity of the blend.

The present inventors have now devised a new high solids, universal primer that out performs existing technology, in particular in terms of serviceable pot life and flexibility. Not only therefore can the composition of the invention be applied over a much longer period but the resulting coating is more flexible. Without wishing to be limited by theory we surmise that both these effects are linked to the lower viscosity we achieve in our invention compared to other high solids coating compositions.

One of the main limitations of the service life of Universal Primers, such as those applied in water ballast tanks, is brittleness. As the steel structure of the vessel moves due to strain from the environment (waves, wind, currents and temperature variations) there is a risk that the coating will crack, the welding seems, being the most sensitive area.

The solvent free system of the invention has proven to be much more flexible, which can be expected to contribute to significantly reduce the maintenance and repair work during which time the vessel is taken out of service.

Another weakness in these tanks is low DFT areas and the developed product has proven extremely good performance even at DFT's as low as 160 micrometer.

The anticorrosive properties of the developed coating have also shown to be exceptionally good. Several accelerated test methods has been utilized to evaluate the anticorrosive properties of the developed product such as rust creep and disbondment of the coating from the steel substrate. All the testing carried out shows that a single coat of the new solvent free epoxy is superior to two coats of existing universal primer coatings when compared at the same total DFT (320 micrometer).

Overcoating intervals is another common challenge with solvent free systems, as the maximum overcoating interval tends to be rather short. The current formulations offer recoating intervals up to 2 weeks under outdoor exposure. This is the same level as existing solvent born products and considered to be good for a solvent free system.

Another target of this development has been to develop a product that can be applied all year around with conventional airless spray equipment and with a good pot life. In order to reach this goal much efforts has been spend on decreasing viscosity whilst maintaining anticorrosive properties, a task that has been successfully completed at least for a temperature interval in the range between −5 and 40° C.

In addition it has been found that the current solvent free epoxy coating compositions offers excellent anticorrosive properties, long pot life and good drying time. In contrast, most solvent free systems show significantly increased drying times and a short pot-life.

SUMMARY OF INVENTION

Thus, viewed from one aspect the invention provides an ultra-high solids content primer coating composition comprising:

(i) 5.0 to 50 wt % of at least one bisphenol F epoxy resin;
(ii) 1.5 to 12 wt % of at least one silane;
(iii) 0.5 to 20 wt % of at least one hydrocarbon resin;
(iv) 1.0 to 15 wt % at least one reactive diluent; and
(v) at least one curing agent;

wherein said composition has a solids content of at least 90 wt % measured according to ASTM D5201-05;

wherein said composition has a viscosity of 200 to 800 cps at 23° C. and 50% RH (ASTM D4287); and wherein the ratio between active hydrogen equivalents in the curing agent and epoxy equivalents of the coating composition is in the range 50:100 to 120:100.

Preferably, the coating composition has a solvent content of less than 5 wt %.

Viewed from one aspect the invention provides an ultra-high solids content primer coating composition comprising:

(i) 5.0 to 50 wt % of at least one bisphenol F epoxy resin;
(ii) 1.5 to 12 wt % of at least one silane;
(iii) 0.5 to 20 wt % of at least one hydrocarbon resin;
(iv) 0 to 15 wt % at least one reactive diluent; and
(v) at least one curing agent;

wherein said composition has a solids content of at least 90 wt % measured according to ASTM D5201-05;

wherein said composition has a viscosity of 200 to 800 cps at 23° C. and 50% RH; and wherein the ratio between active hydrogen equivalents in the curing agent and epoxy equivalents of the coating composition is in the range 50:100 to 120:100.

Viewed from another aspect the invention provides an ultra-high solids content primer coating composition comprising:

(i) 5.0 to 50 wt % of at least one bisphenol F epoxy resin;
(ii) 1.5 to 12 wt % of at least one silane;
(iii) 0 to 20 wt % of at least one hydrocarbon resin;
(iv) 1.0 to 15 wt % at least one reactive diluent; and
(v) at least one curing agent;

wherein said composition has a solids content of at least 90 wt % measured according to ASTM D5201-05;

wherein said composition has a viscosity of 200 to 800 cps at 23° C. and 50% RH (ASTM D4287); and wherein the ratio between active hydrogen equivalents in the curing agent and epoxy equivalents of the coating composition is in the range 50:100 to 120:100.

Viewed from another aspect the invention provides an ultra-high solids content primer coating composition comprising:

(i) 5.0 to 50 wt % of at least one bisphenol F epoxy resin;
(ii) 1.5 to 12 wt % of at least one silane;
(iii) 0 to 20 wt % of at least one hydrocarbon resin;
(iv) 0 to 15 wt % at least one reactive diluent; and
(v) at least one curing agent;

wherein said composition has a solids content of at least 90 wt % measured according to ASTM D5201-05;

wherein said composition has a viscosity of 200 to 800 cps at 23° C. and 50% RH (ASTM D4287); and wherein the ratio between active hydrogen equivalents in the curing agent and epoxy equivalents of the coating composition is in the range 50:100 to 120:100.

Viewed from another aspect the invention provides an ultra-high solids content primer coating composition comprising:

a component (A) comprising at least one bisphenol F epoxy resin; and a component (B) comprising at least one curing agent;

said primer coating composition further comprising at least one silane, and optionally at least one hydrocarbon resin; and optionally at least one reactive diluent;

wherein said coating composition comprises:

(i) 5.0 to 50 wt % of at least one bisphenol F epoxy resin;
(ii) 1.5 to 12 wt % of at least one silane;
(iii) 0 to 20 wt %, such as 0.5 to 20 wt %, of at least one hydrocarbon resin;
(iv) 0 to 15 wt %, such as 1.0 to 15 wt %, of at least one reactive diluent;

wherein said composition has a solids content of at least 90 wt %;

wherein said composition has a viscosity of 200 to 800 cps at 23° C. and 50% RH;

and wherein the ratio between active hydrogen equivalents in the curing agent and epoxy equivalents of the coating composition is in the range 50:100 to 120:100.

Viewed from another aspect the invention provides a kit comprising:

a component (A) comprising at least one bisphenol F epoxy resin; and a component (B) comprising at least one curing agent;

components (A) and (B) being suitable for blending prior to application of the resulting composition to a substrate:

wherein upon blending components (A) and (B) the resulting composition comprises:

(i) 10 to 50 wt % of at least one bisphenol F epoxy resin;
(ii) 1.5 to 12 wt % of at least one silane;
(iii) 0 to 20 wt %, such as 0.5 to 20 wt %, of at least one hydrocarbon resin;
(iv) 0 to 15 wt %, such as 1.0 to 15 wt %, of at least one reactive diluent;

wherein said composition has a solids content of at least 90 wt %;

wherein said composition has a viscosity of 200 to 800 cps at 23° C. and 50% RH;

and wherein the ratio between hydrogen equivalents in the curing agent and epoxy equivalents of the coating composition is in the range 50:100 to 120:100.

Viewed from another aspect the invention provides a kit comprising:

a component (A) comprising:

(i) 20 to 60 wt % of at least one bisphenol F epoxy resin;
(ii) 2.0 to 15 wt % of at least one silane;
(iii) 0.5 to 20 wt % of at least one hydrocarbon resin; and
(iv) 0 to 15 wt %, such as 1.0 to 15 wt %, of at least one reactive diluent;

and a component (B) comprising at least one curing agent.

Viewed from another aspect the invention provides a kit comprising:

a component (A) comprising:

(i) 20 to 60 wt % of at least one bisphenol F epoxy resin;
(ii) 2.0 to 15 wt % of at least one silane;
(iii) 0 to 20 wt % of at least one hydrocarbon resin; and
(iv) 1.0 to 15 wt % of at least one reactive diluent;

and a component (B) comprising at least one curing agent.

Viewed from another aspect the invention provides a kit comprising:

a component (A) comprising:

(i) 20 to 60 wt % of at least one bisphenol F epoxy resin;
(ii) 2.0 to 15 wt % of at least one silane;
(iii) 0 to 20 wt % of at least one hydrocarbon resin; and
(iv) 0 to 15 wt %, such as 1.0 to 15 wt %, of at least one reactive diluent;

and a component (B) comprising at least one curing agent.

Viewed from another aspect the invention provides a substrate coated with a primer composition as herein before defined.

Viewed from another aspect the invention provides a substrate coated with a primer coating composition as herein before defined which has been cured.

Viewed from another aspect the invention provides a process for the preparation of a coating composition as herein before defined comprising blending components (A) and (B).

Viewed from another aspect the invention provides a process for the application of a coating composition to a substrate comprising blending components (A) and (B) to form a mixture and applying said mixture to a substrate, e.g. by airless spraying and optionally allowing said coating to cure.

Viewed from another aspect the invention provides a process for application of a coating composition to a substrate comprising (I) blending components (A) and (B) as hereinbefore defined to form a mixture and applying said mixture to a substrate, e.g. by airless spraying;

(II) before said mixture cures on said substrate, applying a second coating of said mixture onto the coated substrate;

optionally repeating step (II); and (III) allowing the coating composition to cure.

In all embodiments it is preferred if the coating composition comprises 1.0 to 15 wt % of at least one reactive diluent.

In all embodiments it is preferred if the coating composition comprises 0.5 to 20 wt % of at least one hydrocarbon resin.

Definitions

The invention relates to a high solids primer coating composition. The term coating composition is used to define a composition formed from the combination of the first composition (A) and the second composition (B). To prevent premature curing, the primer coating composition of the invention is supplied in two parts, a first composition (A) comprising the epoxy resin and a second composition (B) comprising the curing agent. The other components of the composition are preferably present in component (A) but could also be added via component (B).

DETAILED DESCRIPTION OF INVENTION

This invention relates to an anti-corrosive primer coating composition for a substrate such as a metal substrate especially a steel substrate. That steel substrate can be present on any object on which the coating of the invention might be useful. In particular, the substrate is one which is exposed to the elements, such as wind, rain, ice or snow or is one which is exposed to water, especially sea water. The substrate may be on an off-shore platform, wind turbine, chimney, power station or other industrial unit, bridge, crane, ship, vehicle and so on. Important areas include void spaces, deck, super structures outside hull splash zones on off-shore installations and general outsides on offshore installations where a long service life is required.

In a most preferred embodiment the substrate is part of a ship, in particular the water ballast tank or potable water tank of a ship.

The primer coating composition forms an epoxy primer layer on the substrate. That primer layer can be overcoated as desired although ideally the composition of the invention is a universal primer. The universal primer provides good anticorrosive protection. If additional antifouling properties, color stability or UV resistance is required an overcoating can be applied.

In a preferred embodiment primer coating composition is applied as a single layer and is not overcoated. The nature of any overcoating layer is not a feature of this invention and hence any known overcoating layer may be used. Alternatively, the primer layer may be the only layer present in the substrate. Note that it is preferred if the coating composition is applied as a single coat, i.e. in one application step. There is no need to apply the primer composition in multiple coats therefore.

Primer Coating Composition

The primer layer coating composition comprises a binder based on at least one epoxy resin. The combination of epoxy resins within the primer layer composition is called a binder herein. Shortly before application of the primer layer composition to a substrate, the first composition is mixed with a second composition comprising a curing agent to form the primer layer composition. That primer layer composition then cures on the substrate to form the primer layer.

The binder in the primer layer composition may comprise one or more than one epoxy resins. Ideally, the primer layer composition comprises at least one liquid epoxy resin. The term liquid refers to the state of the epoxy resin at room temperature and pressure of 23° C., 1 atm.

A particular feature of the coating system of the invention is the high solids content and thereby the low content of volatile organic compounds (VOC) present. The primer layer coating composition preferably has a solids content of at least 90 wt %, such as at least 95 wt %, more preferably at least 99 wt %.

A particular feature of the coating system of the invention is the high volume solids % ("VS %") and thereby the low content of volatile organic compounds (VOC) present. The primer layer coating composition preferably has a volume solids % of at least 90%, such as at least 95%, more preferably at least 99%, especially 100%.

The first composition preferably has a volume solids % of at least 80%, such as at least 90% as well. The second composition preferably has a volume solids % of at least 80%, such as at least 90% as well.

The volume solids (expressed in %) is often referred to as "VS %". VS % is determined according to D5201-05.

The primer composition of the invention contains a very low solvent content such as less than 5 wt % solvent, especially less than 2 wt % solvent, more especially less than 1.0 wt % solvent, e.g. 0.5 wt % or less. Ideally there is no solvent present at all in our high solids coating composition.

The first composition may also contain very low levels of solvent such as less than 5.0 wt % solvent, especially less than 2.0 wt % solvent, more especially less than 1.0 wt % solvent, e.g. 0.5 wt % or less. Ideally there is no solvent present at all in the first composition. The second composition may also contain very low levels of solvent such as less than 5.0 wt % solvent, especially less than 2.0 wt % solvent, more especially less than 1.0 wt % solvent, e.g. 0.5 wt % or less. Ideally there is no solvent present at all in the second composition.

The high solids volume and low solvent content leads to lower VOC content. The VOC content is preferably less than 250 g/L, more preferably less than 100 g/L, most preferably less than 50 g/L. In some embodiments the VOC content might be 25 g/L or less, such as 10 g/L or less. In this regard, volatile organic compounds include benzyl alcohol.

The very low content of VOC renders it possible to establish a fast curing coating system which has a very short "T2" time (i.e. tack free time), and a very short "T3" time (hard dry) time. The T2 time may be less than 20 hrs, such as less than 17 hrs. The T3 time may be less than 24 hours (ASTM D5895 measured at 50% RH at 10° C. on a 350 micron film thickness coating). In certain preferred embodiments, the "T2" time is less than 12 hrs hours at 23° C./50% RH. T3 time under the same conditions may be 14 hrs or less such as 12 hrs or less.

The pot life of the coating composition of the invention is preferably at least 1 hr, such as 1 to 3 hrs, e.g. 1.5 to 2.5 hrs. By pot life is meant the time after mixing of the first and second components when the composition is still able to be applied to the substrate by an airless spray procedure. If the composition cures too rapidly the coating composition has a very short pot life. Pot lives of less than 30 mins are commercially challenging given the time it takes to coat a large object such as a ship block and the volumes of houses up to 150 m feeding the spray gun.

Many of the important properties of the composition of the invention are a consequence of the high solids and yet relative low viscosity of the claimed composition.

The viscosity of the coating composition measured just after combination of the two components can be in the range of 80 to 130 KU, such as 90 to 120 KU (at 5° C.) or 60 to 105 KU, such as 70 to 100 KU at 23° C.

Alternatively viewed, the viscosity measured just after combination of the two components may be 200 to 800 cps, such as 200 to 700 cps at 23° C., especially 250 to 600 cps.

The viscosity of the first composition can be in the range of 300 to 800 cps, such as 350 to 750 cps at 23° C.

It will be appreciated that the composition cures over time and hence the viscosity of the composition increases during curing. The viscosity measured in claim 1 is taken immediately after mixing and hence before any significant degree of the curing process has taken place. By immediately after mixing means within 5-10 mins of mixing.

Epoxy Resin

The epoxy-based binder system comprises one or more bisphenol F epoxy resins. The use of multiple epoxy groups in that resin (i.e. at least 2 such groups) ensures that a cross-linked network can form.

The bisphenol F epoxy resin of the primer composition may have an EEW value of 100 to 350. However, it is particularly preferred if the EEW of an epoxy resin of the primer layer composition is 300 or less such as 100 to 300, especially 150 to 250, especially 170-200. Ideally, the epoxy resin is a liquid.

This level of EEW is important as it enables the preparation of a primer layer composition having a desirable mixing ratio (e.g. 1:1 to 4:1, such as 3:1 vol solids) between epoxy resin component (first composition A) and curing agent component (second composition B).

Also, it is well known that low Mw (often correlated with low EEW) resins have lower viscosity thus demanding less solvent for formulation. That reduces VOC content and enables the high solids content of the invention. Care must be taken however that Mw is not too low as there is a risk of crystallisation if Mw is too low.

The Mw of the bisphenol F resin may be more than 170 g/mol.

A preferred bipshenol F (4',4'-methylenebisphenol) resin derives from the combination of bisphenol F and epichlorohydrin. The use of difunctional resins is especially preferred.

The use of bisphenol F resins is important as these have been found to reduce the viscosity of the coating composition relative to coating compositions which comprise the more common bisphenol A resins.

It is possible to use a mixture of one or more epoxy resins, such as two liquid epoxy resins. Thus, two type bisphenol F resins might be employed.

These resins are readily available commercial products such as YDF-170 (Kukdo), GY285 (Huntsman), DER354 (Dow), EPIKOTE 862 (Momentive), BFE-170 (CCP), or KF8100 (Kolon).

As well as the bisphenol F group, the composition may contain additional epoxy resins selected from aromatic or non-aromatic epoxy resins, containing one or more epoxy group per molecule, which is placed internally, terminally, or on a cyclic structure.

Suitable additional epoxy-based binder systems include epoxy and modified epoxy resins selected from bisphenol A, Novolac epoxies, dimer modified epoxy, cycloaliphatic epoxies, glycidyl esters and epoxy functional acrylics or any combinations thereof.

Solid Epoxy

In a further preferred embodiment, a liquid epoxy primer is combined with a semi-solid or a solid epoxy resin in the binder composition. The combination of solid and liquid epoxy resins may lead to an ideal drying/curing time, whilst minimising VOC. By adding solid and liquid epoxy resins, we can reduce solvent and we therefore offer an ideal balance between drying/curing time, ease of handling and VOC requirements.

The solid epoxy resin contains one or more epoxy groups. Suitable epoxy-based binder systems are believed to include epoxy and modified epoxy resins selected from bisphenol A, Novolac epoxies, non-aromatic hydrogenated epoxies, dimer modified epoxies, cycloaliphatic epoxies, glycidyl esters and epoxy functional acrylics or any combinations thereof.

Preferred solid epoxy resins include bisphenol A based resins, such as 4,4'-isopropylidenediphenol-epichlorohydrin resins, novolac resins, and so on.

Most preferred are solid epoxy resins with an equivalent epoxy weight (EEW) of 300-1000. It is most preferred however if the EEW of the solid epoxy resin is in the range of 350 to 750, such as 400 to 700, especially 500 to 670. The use of a bisphenol A type resin is most preferred.

Alternatively viewed, in a preferred embodiment at least one epoxy resin component has an EEW less than 300 and a second epoxy resin has an EEW more than 300.

If there are both liquid and solid epoxy resins present in the binder of the primer layer, it is preferred if the liquid epoxy resin is in excess relative to the solid epoxy resin. Typically, the weight ratio of liquid to solid epoxy resin is in the range of 2:1 to 1:1, such as 2:1 to 1.1:1 in the binder.

It is however preferred if the primer layer composition and hence the first composition comprises liquid epoxy resins only.

As noted below, the primer layer composition will contain other components in addition to the epoxy resins forming the binder component. The binder component preferably forms 10 to 50 wt % of the primer layer composition, such as 10 to 40 wt %, especially 20 to 40 wt %, most especially 25 to 35 wt %.

The binder component preferably forms 25 to 70 wt % of the first composition that makes up the primer layer composition, such as 25 to 60 wt % of the first composition.

Silane

The coating composition of the invention also contains at least one silane. Silanes can improve drying properties at low temperature, flexibility, adhesion to substrates and anti-corrosive performance. The silane can be provided as part of the first composition or as part of the second composition, preferably the first composition. Ideally, the silane is one that contains an epoxy group. Silanes of use in the invention are generally of low Mw such as less than 400 g/mol. Suitable silanes are of general formula (I) or (II)

$$Y—R_{(4-z)}SiX_z \quad (I) \text{ or}$$

$$Y—R_{(3-y)}R^1SiX_y \quad (II)$$

wherein z is an integer from 1 to 3, wherein y is an integer from 1 to 2,

R is a hydrocarbonyl group having 1 to 12 C atoms optionally containing an ether or amino linker, $R^1$ is a hydrocarbonyl group having 1 to 12 C atoms;

Y is a functional group bound to R that can react with corresponding hardener or binder functionalities and is preferably an amine or epoxy group, and each X independently represents a halogen group or an alkoxy group.

Preference is given to isocyanate, epoxy, amino, hydroxy, carboxy, acrylate, or methacrylate groups as functional groups Y. The Y group can bind to any part of the chain R. It will be appreciated that where Y represents an epoxy group then R will possess at least two carbon atoms to allow formation of the epoxide ring system.

It is especially preferred if Y is an amino group or epoxy group. Amino groups are preferably $NH_2$. Y is preferably an epoxy group.

If the Y group is a polyamine and reacts with epoxy binder, it is preferred if the silane is provided as part of the (B) component in this scenario. In general, in the kit of the invention, the silane should not react with any ingredient of the component of the kit in which the silane is present.

It is especially preferred if X is an alkoxy group such as a C1-6 alkoxy group, especially methoxy or ethoxy group. It is also especially preferred if there are two or three alkoxy groups present. Thus z is ideally 2 or 3, especially 3. Subscript y is preferably 2.

$R^1$ is preferably $C_{1-4}$ alkyl such as methyl.

R is a hydrocarbonyl group having up to 12 carbon atoms. By hydrocarbonyl is meant a group comprising C and H atoms only. It may comprise an alkylene chain or a combination of an alkylene chain and rings such as phenyl or cyclohexyl rings. The term "optionally containing an ether or amino linker" implies that the carbon chain can be interrupted by a —O— or —NH— group in the chain, e.g. to form a silane such as [3-(2,3-Epoxypropoxy)propyl]trimethoxysilane: $H_2COCHCH_2OCH_2CH_2CH_2Si(OCH_3)_3$. It is preferred if the group Y does not bind to a carbon atom which is bound to such a linker —O— or —NH—.

R might therefore represent $(C_6H_5)—NH—(CH_2)_3—$ or $(MePh)-NH—(CH_2)_3—$ or $(C_6H_5)—(CH_2)_3$ and so on.

R is preferably an unsubstituted (other than Y obviously), unbranched alkyl chain having 2 to 8 C atoms optionally containing an ether or amino linker.

A preferred silane general formula is therefore of structure (III)

$$Y'—R'_{(4-z')}SiX'_{z'} \quad (III)$$

wherein z' is an integer from 2 to 3, R' is a unsubstituted, unbranched alkyl chain having 2 to 8 C atoms optionally containing an ether or amino linker, Y' is an amino or epoxy functional group bound to the R' group, and X' represents an alkoxy group.

Examples of such silanes are the many representatives of the products manufactured by Evonik in Rheinfelden and marketed under the brand name of Dynasylan®D, the Silquest® silanes manufactured by (Momentive), and the GENOSIL® silanes manufactured by Wacker.

Specific examples include methacryloxypropyltrimethoxysilane (Dynasylan MEMO, Silquest A-174NT), 3-mercaptopropyltri(m)ethoxysilane (Dynasylan MTMO or 3201; Silquest A-189), 3-glycidoxypropyltrimethoxysilane (Dynasylan GLYMO, Silquest A-187), tris(3-trimethoxysilylpropyl) isocyanurate (Silquest Y-11597), beta-(3,4-epoxycyclohexyl)ethyltrimethoxysilane (Silquest A-186), gamma-isocyanatopropyltrimethoxysilane (Silquest A-Link 35, Genosil GF40), (methacryloxymethyl)trimethoxysilane (Genosil XL 33), isocyanatomethyl)trimethoxysilane (Genosil XL 43), 3-aminopropyltrimethoxysilane (Dynasylan AMMO; Silquest A-1110), 3-aminopropyltriethoxysilane (Dynasylan AMEO, Silquest A-1100) or N-(2-aminoethyl)-3-aminopropyltrimethoxysilane (Dynasylan DAMO, Silquest A-1120) or N-(2-aminoethyl)-3-aminopropyltriethoxysilane, triamino-functional trimethoxysilane (Silquest A-1130), bis(gamma-trimethoxysilylpropyl)amine (Silquest A-1170), N-ethyl-gamma-aminoisobytyltrimethoxysilane (Silquest A-Link 15), N-phenyl-gamma-aminopropyltrimethoxysilane (Silquest Y-9669), 4-amino-3,3-dimethylbutyltrimethoxysilane (Silquest Y-11637), (N-cyclohexylaminomethyl)triethoxysilane (Genosil XL 926), (N-phenylaminomethyl)trimethoxysilane (Genosil XL 973), Deolink Epoxy TE and Deolink Amino TE (D.O.G Deutsche Oelfabrik) and mixtures thereof.

Other specific silanes of interest include 3-aminopropyltriethoxysilane, 3-aminopropyltrimethoxysilane, N-(Aminoethyl)-aminopropyltrimethoxysilane $H_2NCH_2CH_2NHCH_2CH_2CH_2Si(OCH_3)_3$, 3-aminopropylmethyldiethoxysilane, 3-(2-aminoethylamino)propylmethyldimethoxysilane, $(H_2NCH_2CH_2NHCH_2CH_2CH_2SiCH_3(OCH_3)_3)$, [3-(2,3-Epoxypropoxy)propyl]triethoxysilane $(H_2COCHCH_2OCH_2CH_2CH_2Si(OCH_2CH_3)_3$, [3-(2,3-Epoxypropoxy)propyl]trimethoxysilane $(H_2COCHCH_2OCH_2CH_2CH_2Si(OCH_3)_3)$.

The use of silane GLYMO is especially preferred. A mixture of silanes might also be used.

The amount of silane present in the first composition may be 2.0 to 15 wt %, preferably 2.0 to 10 wt %, more preferably 2.0 to 8.0 wt % on total weight, ideally 2.0 to 7.0 wt %. The amount of silane in the coating composition may be 1.5 to 12 wt %, preferably 1.5 to 8.0 wt %, more preferably 1.5 to 6.0 wt % on total weight, ideally 2.0 to 6.0 wt %, such as 2.5 to 8.0 wt % or 3.0 to 6.0 wt %. In general, silane is not present in the second composition. The amount of silane in the combined composition is determined by the amount in the first composition taking into account the amount of second composition then added. Increasing the silane content tends to decreases the viscosity of the composition. The combination therefore of the bisphenol F and the relatively high silane content (minimum 1.5 wt %) leads to a coating composition which has a remarkably low viscosity given the very low level of solvent employed.

Reactive Diluent

The primer layer composition preferably further comprises a reactive diluent, preferably formed from a modified epoxy compound.

Examples of such reactive diluents include phenyl glycidyl ether, alkyl glycidyl ether (number of carbon atoms in alkyl group: 1 to 16), glycidyl ester of versatic acid ($R^1R^2R^3C$—COO-Gly, where $R^1R^2R^3$ are alkyl groups such as C8 to C10 alkyl and Gly is a glycidyl group), olefin epoxide ($CH_3—(CH_2)n$-Gly, wherein n=11 to 13, Gly: glycidyl group), 1,6-hexanediol diglycidyl ether (Gly-O—$(CH_2)_6$—O-Gly), neopentyl glycol diglycidyl ether (Gly-O—$CH_2—C(CH_3)_2—CH_2$—O-Gly), trimethylolpropane triglycidyl ether ($CH_3—CH_2—C(CH_2$—O-Gly$)_3$), and C1-20-alkylphenyl glycidyl ether (preferably C1-5 alkylphenylglycidyl ether), e.g., methylphenyl glycidyl ether, ethylphenyl glycidyl ether, propylphenyl glycidyl ether and glycidyl neodecanoate. Another preferred option is Cardolite NC-513 derived from the reaction of epichlorohydrin and an oil obtained from the shells of cashew nuts.

Of the above reactive diluents, preferable are aliphatic reactive diluents such as 1,6-hexanediol diglycidyl ether or 1,4-butanediol diglycidyl ether. Aliphatic glycidyl ethers of chain length 8 to 14 are also preferred. The preferred reactive diluent will be aliphatic as it contributes to the flexibility of the coating. The use of p-TBPGE is also possible (para tertiary butyl phenyl glycidyl ether).

It is preferred if the reactive diluent is polyfunctional as opposed to monofunctional as this speeds up the drying process and the increased crosslinking density. This also contributes to better anticorrosive properties.

The above reactive diluents can be used singly or in combination of two or more diluents.

The reactive diluent is preferably present in the first composition along with the epoxy resin.

In the primer layer composition as a whole, the reactive diluent is desirably contained in an amount of 0.5 to 20% by weight, preferably 1.0 to 20% by weight, e.g. 1.0-15 wt %, especially 2.0 to 12 wt %.

In the first composition, the reactive diluent is desirably contained in an amount of 2.0 to 30% by weight, preferably 5.0 to 20% by weight, e.g. 5.0 to 15 wt %, especially 6.0 to 12 wt %.

By adding the reactive diluent in the above amount, viscosity of the main primer layer composition is lowered to allow preparation of a high-solids composition.

Preferably the viscosity of the reactive diluent is <50 cP, preferably <30 cP, most preferably viscosity <20 cP at 23° C. and 50% RH Method is cone and plate viscometer according to ISO 2884-1:2006.

Hydrocarbon Resin

The coating composition of the invention may also comprise a hydrocarbon resin. This is preferably formulated as part of the first composition. In general, all types of hydrocarbon resin such as solid or liquid pure C5 and C9 hydrocarbon resins, mixtures of C5/C9, aliphatic/aromatic feedstocks and modified type hydrocarbon resins with epoxy or hydroxyl can be utilized. The C5 resins are generally oligomers or polymers with five carbons. The C9 resins are generally oligomers or polymers of nine-carbon aromatic monomers. Preferably, the hydrocarbon resin has a molecular weight less than 1000 g/mol and most preferably molecular weight less than 500 g/mol.

In a most preferred embodiment, the hydrocarbon resin is a xylene formaldehyde resin (such as EPODIL LV5).

Ideally, the hydrocarbon resin is a petroleum resin. The petroleum resin is a polymer that may contain a hydroxyl group, which is formed using, as a main raw material, a fraction produced as a by-product in the petroleum refining, from petrochemical and carbon feedstocks.

Examples of the petroleum resins employable in the invention include an aromatic petroleum resin obtained by polymerizing a C9 fraction (e.g. styrene derivatives such as alpha methylstyrene, o,m,p-cresol, indene, methyl indene, cumene, napthalene or vinyltoluene) obtained from a heavy oil that is produced as a by-product by naphtha cracking, an aliphatic petroleum resin obtained by polymerizing a C5 fraction such as 1,3-pentadiene or isoprene, 2-methyl-2-butene, cyclopentadiene, dicyclopentadiene or cyclopentene. Also employable in the invention are a copolymer-based petroleum resin obtained by copolymerizing the C9 fraction and the C5 fraction, an aliphatic petroleum resin wherein a part of a conjugated diene of the C5 fraction such as cyclopentadiene or 1,3-pentadiene is cyclic-polymerized, a resin obtained by hydrogenating the aromatic petroleum resin, and an alicyclic petroleum resin obtained by polymerizing dicyclopentadiene. Mixtures of diaryl and triaryl compounds obtained from reaction of C9 blends under catalytic conditions are also possible to utilize. Into these petroleum resins, hydroxyl groups are introduced. Of the above petroleum resins, a hydroxyl group-containing aromatic petroleum resin is particularly preferable from the viewpoints of water resistance and seawater resistance.

Another possibly hydrocarbon resin is a xylene resin synthesized from 1,3-dimethylbenzene and formaldehyde (e.g. Epodil LV5). Also employable are xylene resins modified with phenols such as bifunctional phenol (e.g., phenol, para-t-butylphenol, p-Cumylphenol, o,p-Dicumylphenol).

Another option is a coumarone resin which is a copolymer containing a coumarone constituent unit, an indene constituent unit and/or a styrene constituent unit in its main chain.

The indene-coumarone resin may be modified with phenol at the end, and at least a part of aromatic rings in the coumarone resin may be hydrogenated. Such coumarone resins include a liquid product having a number-average molecular weight Mn (measured by GPC, in terms of polystyrene, the same shall apply hereinafter) of 200 to 300 and a solid product having a number-average molecular weight Mn of 600 to 800, and any one of them may be used singly, or both of them may be used in combination.

The use of solid hydrocarbon resins will generally be avoided.

Preferably the hydrocarbon resin forms 0.5-20 wt % of the coating, preferably 1.0 to 20% by weight, e.g. 1.0-15 wt %, especially 2.0 to 12 wt %.

In the first composition, the hydrocarbon resin is desirably contained in an amount of 2.0 to 30% by weight, preferably 2.0 to 15% by weight, e.g. 3.0 to 10 wt %.

Most preferred is a hydrocarbon resin with an OH content of 0-5 wt % or a xylene formaldehyde with a OH content <3%.

It is also possible to utilize hydrocarbon resins based on hydrogenation of natural resins such as gum rosin, wood rosin and tall oil rosins. Hydrocarbon resins also based on esterification of rosin esters can be employed.

Additives

The primer layer composition may also contain various other components, e.g. to enhance its anticorrosive properties. In particular, the primer layer composition may comprise metal oxides, metal carbonates, talc, feldspar and so on to act as anti-corrosive materials. Specific anticorrosive functional pigments include zinc phosphate, zinc oxide, zinc dust, aluminium flakes, lead oxide. Zinc powder or zinc dust, which is well known to incorporate in epoxy primer to produce a zinc epoxy primer, is in this respect of special interest. Zinc powder or zinc dust can all or partly be replaced by a zinc alloy, e.g. as disclosed in WO 2008/125610. Auxiliary corrosion inhibitors, for example a molybdate, phosphate, tungstate or vanadate, ultrafine titanium dioxide, and/or zinc oxide and/or a filler such as silica, calcined clay, alumina silicate, talc, barytes or mica.

The preferable filler package will comprise an extender with a low oil absorption value such as $BaSO_4$, glass spheres, Feldspar, calcite, silica, aluminium oxide, zirconium oxide, dolomite, kaolin or wollastonite and optionally a laminar type of extender such as mica, talc, aluminium flakes, chlorite and china clay.

The primer layer composition or the first composition may comprise 30 to 70 wt % of anticorrosive agents. Ideally these materials form more than 45 wt % of the primer layer composition.

Other ingredients than the above various ingredients include anti-sagging/anti-setting agent, plasticizer, inorganic or organic dehydrator (stabilizer), antifouling agent, colors and other film-forming ingredients, can be added when needed.

As the anti-sagging/anti-setting agent (thixotropic agent), a thixotropic agent, such as polyamide wax, polyethylene wax or a bentonite-based thixotropic agent, may be employed. Examples of such anti-sagging/anti-setting agents include Cryvallac Ultra, Crayvallac LV, both from Arkema, Thixatrol ST and Thixatrol Max, both from Elementis, Disparlon 6650 from Kusumoto Chemicals Ltd.

Examples of the color pigments include titanium white, red iron oxide, yellow iron oxide, carbon black and organic color pigments. Tinters may be used to produce specific colours.

The total amount of the above-mentioned various additive components depend upon the use and cannot be determined indiscriminately, but they are frequently contained in the total amount of 10 to 65% by weight in the first composition. Further, they are frequently contained in the total amount of 10 to 65 parts by weight in 100 parts by weight of coating composition.

Suitable solvents, if present, are hydrocarbons such as xylene. Solvent, if present, is preferably added to the first composition used to make the primer layer composition. Some solvent might also be present with the curing agent or in some of the additives used. The nature of the solvent in the primer layer is not restricted, and publicly known solvents having boiling points of wide range are employable. Examples of such solvents include xylene, toluene, MIBK, methoxypropanol, MEK, butyl acetate, benzyl alcohol, octyl phenol, resorcinol, n-butanol, isobutanol and isopropanol. The above solvents can be used singly or in combination of two or more kinds.

It is preferred however if no solvent is present at all.

Curing Agent

To allow curing of the first composition containing the epoxy binder, a polyamide, polyamine, epoxy-amine adduct, phenalkamine, or phenalkamide curing agent may be used as is well known in the art. This may also be known as a crosslinking agent or hardener. To function as a curing agent, the compound must contain at least two "reactive" hydrogen atoms linked to nitrogen. Thus the curing agent typically contains at least two amines which may be primary or secondary.

Suitable curing agents are believed to include amines or amino functional polymers selected from aliphatic amines and polyamines (e.g. cyclo-aliphatic amines and polyamines), polyamido amines, polyoxy alkylene amines (e.g. polyoxy alkylene diamines), aminated polyalkoxy ethers (e.g. those sold commercially as "Jeffamines"), alkylene amines (e.g. alkylene diamines), aralkyl amines, aromatic amines, Mannich bases (e.g. those sold commercially as "phenalkamines"), amino functional silicones or silanes, and including epoxy adducts and derivatives thereof.

Examples of suitable commercially available curing agents are:

Cardolite NC-541, ex Cardanol Chemicals (USA), Mannich base

Cardolite Lite 2001, ex Cardanol Chemicals (USA), Mannich base

Sunmide CX-105X, ex Sanwa Chemical Ind. Co. Ltd. (Singapore), Mannich base

Epikure 3090 Curing Agent, ex Resolution Performance Products (USA), polyamidoamine adduct with epoxy Epikure 3140 Curing Agent, ex Resolution Performance Products (USA), polyamidoamineEpikure 3115X-70 Curing Agent, ex Resolution Performance Products (USA), polyamidoamine SIQ Amin 2015, ex SIQ Kunstharze GmbH (Germany), polyamidoamine SIQ Amin 2030, ex SIQ Kunstharze GmbH (Germany), polyamidoamine Polypox VH 40309/12, ex Ulf Primmer Polymer-Chemie GmbH (Germany), polyoxyalkylene amine Polypox VH 40294, ex Ulf Prümmer Polymer-Chemie GmbH (Germany), Mannich base Ancamine 2609, ex Air Products (UK), Mannich base Ancamine 2695, ex Air Products (UK), polyamine Ancamine 2738, ex Air Products (UK), polyamine Adeka Hardener, ex Adeka Corporation (Japan), Mannich base AP1077, Admark, Mannich base CeTePox 1490 H, ex CTP Chemicals and Technologies for Polymers (Germany), polyoxyalkylene amine Epoxy hardener MXDA, ex Mitsubishi Gas Chemical Company Inc (USA), aralkyl amine Diethylaminopropylamine, ex BASF (Germany), aliphatic amine Gaskamine 240, ex Mitsubishi Gas Chemical Company Inc (USA), aralkyl amine Cardolite Lite 2002, ex Cardanol Chemicals (USA), Mannich base Aradur 42 BD, ex Huntsman Advanced Materials (Germany), cycloaliphatic amine Isophorondiamin, ex BASF (Germany), cycloaliphatic amine Crayamid E260 E90, ex Cray Valley (Italy), polyamidoamine adduct with epoxy Aradur 943 CH, ex Huntsman Advanced Materials (Switzerland), alkylene amine adduct with epoxy The use of modified polyamines is most preferred. Phenalkamines may also be used. It will be appreciated that the curing agent is shipped separated from the epoxy resin and is only mixed with the epoxy resin shortly before application. The curing agent of the invention is therefore shipped as a second composition that is combined with the first composition to form the primer layer composition. The second composition may consist of the curing agent.

A key parameter of the curing agent of interest is a viscosity below 300 cP, such as 100 to 300 cP.

In a preferred embodiment, the curing agent is employed without the use of a separate catalyst to accelerate the crosslinking process. Some known curing agents are however combined with a catalyst such as a tertiary amine catalyst and that is within the scope of the invention. It will be appreciated that the curing agent can be supplied neat or in a solvent, ideally neat.

It is preferred if the epoxy-based binder systems that cure at ambient temperatures.

The number of "active hydrogen equivalents" in relation to the one or more curing agents is the sum of the contribution from each of the one or more curing agents. The contribution from each of the one or more curing agents to the active hydrogen equivalents is defined as grams of the curing agent divided by the active hydrogen equivalent weight of the curing agent, where the active hydrogen equivalent weight of the curing agent is determined as:

grams of the curing agent equivalent to 1 mol of active hydrogen. For adducts with epoxy resins the contribution of the reactants before adduction is used for the determination of the number of "active hydrogen equivalents" in the complete epoxy-based binder system.

The number of "epoxy equivalents" is the sum of the contribution from each of the one or more epoxy resins and any other component that contains an epoxy such as the silane and reactive diluent. The contribution from each of the one or more epoxy resins to the epoxy equivalents is defined as grams of the epoxy resin divided by the epoxy equivalent weight of the epoxy resin, where the epoxy equivalent weight of the epoxy resin is determined as: grams of the epoxy resin equivalent to 1 mol of epoxy groups. For adducts with epoxy resins the contribution of the reactants before adductation is used for the determination of the number of "epoxy equivalents" in the epoxy-based binder system.

Preferably the ratio between the hydrogen equivalents of the totality of the curing agents and the totality of epoxy equivalents is in the range of 50:100 to 120:100.

Especially preferred epoxy-based coating compositions have a ratio between the active hydrogen equivalents of the curing agent and the epoxy equivalents of the composition in the range of 60:100 to 110:100 such as 70:100 to 105:100, e.g. 80:100 to 90:100.

The mixing ratio of the first and second compositions is of course governed by the relative amounts of epoxy and active hydrogens present. Ideally, the mixing ratio in solids volume is 1:1 to 10:1, first to second composition, such as 5:1 to 2:1.

Unless otherwise stated, all amounts stated as % by solids volume should be understood as % by solids volume of the mixed primer layer composition ready to be applied.

The curing agent composition (second composition) and first composition are mixed shortly before application to the substrate.

Preparation of the Primer Composition

The primer composition may be prepared by any suitable technique that is commonly used within the field of paint production. Thus, the various constituents may be mixed together using a high speed disperser, a ball mill, a pearl mill, a three-roll mill, an inline mixer etc. The paints according to the invention may be filtered using bag filters, patron filters, wire gap filters, wedge wire filters, metal edge filters, EGLM turnoclean filters (ex Cuno), DELTA strain filters (ex Cuno), and Jenag Strainer filters (ex Jenag), or by vibration filtration.

The primer composition to be used herein are conveniently prepared by mixing the components. As an example, the first composition and the curing agent component (the second composition) can be mixed by adding the curing agent to the epoxy first composition and stirring well until the mixture is homogeneous. The mixture is immediately ready for application, e.g. by spray application, but may also be given an induction time prior to application.

Application of the Primer Composition

The primer composition can be applied to a substrate (in particular a steel structure) by well-known standard application methods like conventional air-spraying or by airless- or airmix-spraying equipment or 2K airless spray pumps (or alternatively by means of a brush or a roller, in particular when used as a stripe coat). Preferably the composition is applied at ambient conditions, e.g. up to 30° C., such as 20 to 25° C., without pre-heating the coating composition. Conventional pressure such as 3 to 5 bars can be used, preferably 4-5 bars at pump ratio 60:1-75:1, more preferred ratio is 68:1-75:1. At this pressure, the coating composition may be applied with a hose length of 30-45 meters as measured from the pump to the spray gun.

Film Thickness

The coating is typically applied in a total dry film thickness of 100-500 μm, such as 150-350 μm. It is preferred that the dry film thickness of the primer layer is at least 100 μm. The applied film thickness might vary depending on the nature of substrate being coated and its predicted exposure scenario.

Curing

Once a substrate is coated with the coating, the coating must be cured. The primer layer may cure spontaneously. Whilst irradiation and heat may be used to encourage curing, the compositions of the invention cure at ambient temperature without further intervention.

Whilst it is preferred to apply a single coating, as the volatile content of the coating of the invention is so low, it is possible to apply a further coating whilst the primer layer is "wet". There is no requirement therefore to wait for the first coating to cure before applying a further coating. In order to build-up layer thickness, it is known to apply multiple layers of the primer coating but conventionally, each layer is cured (dried) before a further layer is applied. In the present invention, application of further layers can be carried out on a wet (or uncured) primer layer. This speeds up the application process.

In a further aspect therefore the invention includes a process in which further coats of the primer layer coating composition are applied to an undercoat of the primer layer composition without an intermediate curing step. Alternatively viewed, the invention includes a process in which further coats of the primer layer coating composition are applied to an undercoat of the primer layer composition before the undercoat has cured.

The invention will now be described with reference to the following non limiting examples.

Analytical Methods

General Procedure for Preparation of the Compositions

Component (A) of the primer layer was made by mixing all the indicated ingredients (in parts by weight) in a conventional manner known to the person skilled in the art. Component (A) was then subsequently mixed with Component (B)/Curing agent prior to application. The primer layer is typically applied by conventional airless spraying to a steel substrate.

Determination of Viscosity Using Cone and Plate Viscometer

The viscosity of the binders and paint compositions are determined according to ISO 2884-1:2006 (ASTM D4287) using a Cone and Plate viscometer set at a temperature of 23° C. at 50% RH and providing viscosity measurement range of 0-10 P at 10000 $s^{-1}$.

The Stormer viscosity (KU) was carried out according to ASTM D 562 with a stormer viscometer at 23° C.

Determination of Drying Time by Beck and Koller (BK) Drying Time Recorder

The applied films were exposed at 23° C./50% RH (or other condition as indicated) throughout the determination of the drying time. Beck Koller drying time was tested using the Beck and Koller drying time recorder in accordance with ASTM D5895. T2—Tack free, T3—Hard dry time.

For this test, 300 microns DFT is used.

Determination of Pot Life

The pot life of the paints is determined by measuring the viscosity increase directly after mixing of minimum 100 g of the paint compositions at 23° C. The viscosity is measured according to ASTM D 562 using a Stormer viscometer set at a temperature of 23° C. every 15 minutes. The pot life is set to the time where the viscosity has reached 110 KU.

Elongation:

Conical mandrel bend test. Method is ASTM D 522.

On the conical panel (110×170×1T), each paint was applied with thickness of 600 μm by applicator. Drying condition before bending is 4 weeks at ambient temperature (23° C., 50% RH).

Determination of Dry Film Thickness (DFT)

Dry film thickness is measured using an Elcometer 456FBSI.

Determination of Solids Content of the Compositions

The solids content in the compositions are calculated in accordance with ASTM D5201-05.

Calculation of the Volatile Organic Compound (VOC) Content of the Coating Compositions The volatile organic compound (VOC) content of the coating compositions is calculated in accordance with ASTM D5201-05.

Testing of Chemical Resistance.

The coating compositions were applied to ground steel panels (surface cleanliness St 3 with 5~10 microns profile) at 400 μm wet film thickness (WFT), then cured for 7 days at ambient conditions The coated panels were then immersed in xylene and in methyl isobutyl ketone (MIBK) at 23° C. The panels were checked after 1, 2, 3, 4, 8 and 24 hours. The testing was stopped when the coating lost adhesion to the substrate (peel-off).

Evaluation Criteria

G: Good condition, EW: Edge wrinkling, P: Peel-off, B: Blisterings

Testing of Anticorrosive Performance by Cathodic Disbondment Test and Seawater Immersion Test Anticorrosive performance was assessed by the cathodic disbondment, test according to ASTM G8. The test duration was 30 days. The coating compositions were applied to sand blasted steel panels (surface cleanliness Sa 2½) at 600 μm WFT, then cured for 7 days at ambient conditions before initiating the test.

Performance was Ranked as:

1: Excellent
2: Acceptable
3: Bad/failure of test

Sea water immersion was carried out according to ISO 2812-2 at 40° C. for 30 days.

The coating compositions were applied to blasted or ground steel panels at 600 μm WFT, then cured for 7 days at ambient conditions before initiating the test.

Performance was Ranked as:

1: Excellent
2: Acceptable
3: Bad/failure of test

Examples

In all example the ratio between active hydrogen equivalents in the curing agent and epoxy equivalents of the coating composition is 100:100. The calculated VOC of all these examples is 0 hence the solids content is 100%.

The following examples were prepared:

TABLE 1

Effect of epoxy resin

| Material Name | | EEW | Recipe 1 | Recipe C2* | Recipe C3* |
|---|---|---|---|---|---|
| First Comp.A ppw | | | | | |
| BPF liquid epoxy | Binder | 172 | 30 | | |
| BPA liquid epoxy | Binder | 190 | | 30 | |
| BPA(n = 0) | Binder | 172 | | | 30 |
| SILANE A-187 | Binder | 236 | 5 | 5 | 5 |
| EPODIL LV5 | Hydrocarbon resin | | 5 | 5 | 5 |
| $TiO_2$ Universal | Filler | | 10 | 10 | 10 |
| $BaSO_4$ | Filler | | 39 | 39 | 39 |
| Crayvallac Ultra | Filler | | 1 | 1 | 1 |
| NC-513 | Reactive diluent | 490 | 10 | 10 | 10 |
| Second Comp.B | | AHEW | | | |
| Modified Polyamine AHEW 95 | Curing agent | 95 | 100 | 100 | 100 |

*comparative example

Stoichiometric amounts of the curing agent and binder are used.

Type of Epoxy Resin

1. BPF liquid epoxy: Bisphenol-F epoxy resin
2. BPA liquid epoxy: Bisphenol-A epoxy resin
3. BPA (n=0) epoxy: Bisphenol-A(n=0) epoxy resin

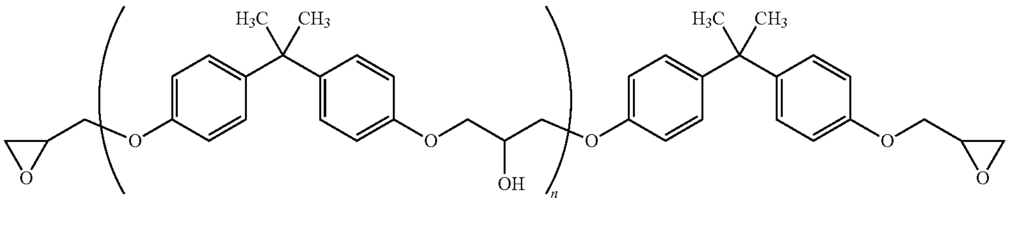

The viscosities of the resins are presented in table 2

TABLE 2

| | 5° C. | Recipe 1 | Recipe C2 | Recipe C3 | 23° C. | Recipe 1 | Recipe C2 | Recipe C3 |
|---|---|---|---|---|---|---|---|---|
| Viscosity | KU | * | * | ** | KU | 111 | 120.1 | 115.4 |
| comp. A | CPS | 600 | 820 | ** | CPS | 620 | 800 | 620 |
| Viscosity | KU | 106.5 | 115 | ** | KU | 82.5 | 89.1 | 80.3 |
| comp. A + comp. B | CPS | 460 | 620 | ** | CPS | 480 | 640 | 420 |

* not possible to measure because outside the measureable region (>140 KU)
** not possible to measure because crystalized The data shows that bisphenol F is the preferred option as it provides the less viscous coating than recipe C2. The lower molecular weight Bisphenol A of recipe C3 had a tendency to crystallize at low temperature.

Effect of Silane Coupling Agent:

TABLE 3a

| Material Name | EEW | C4* | C5* | 6 | 7 | 8 | 9 | C10 |
|---|---|---|---|---|---|---|---|---|
| | | Comp. A ppw | | | | | | |
| BPF liquid epoxy | 172 | 40 | 40 | 40 | 40 | 40 | 40 | 40 |
| Silane A-187 | 236 | 0.5 | 2 | 4 | 6 | 8 | 10 | |
| EPODIL LV5 | | 5 | 5 | 5 | 5 | 5 | 5 | 5 |
| Crayvallac Ultra | | 1 | 1 | 1 | 1 | 1 | 1 | 1 |
| TiO2 Universal | | 10 | 10 | 10 | 10 | 10 | 10 | 10 |
| BaS04 | | 38.5 | 37 | 35 | 33 | 31 | 29 | 39 |
| NC-513 | 490 | 5 | 5 | 5 | 5 | 5 | 5 | 5 |
| | | Comp. B AHEW | | | | | | |
| Modified Polyamine AHEW 95 | 95 | 100 | 100 | 100 | 100 | 100 | 100 | 99.5 |
| Silane AMEO | 110 | | | | | | | 0.5 |

Further tests have been carried out as follows to demonstrate the importance of the silane. Recipe A is included to observe the performance of the formulation without any epoxy silane. Test recipes (from 6 to R9') are slightly different from the recipes in table 3a above as the amounts of barium sulphate are fixed.

TABLE 3b

| Recipe | A | 6' | 7' | 8' | 9' |
|---|---|---|---|---|---|
| COMP A ppw | | | | | |
| BPF Liquid | 40 | 40 | 40 | 40 | 40 |
| EPODIL LV5 | 5 | 5 | 5 | 5 | 5 |
| Crayvallac Ultra | 1 | 1 | 1 | 1 | 1 |
| TiO2 Universal | 10 | 10 | 10 | 10 | 10 |
| BaSO4 | 39 | 39 | 39 | 39 | 39 |
| NC-513 | 5 | 5 | 5 | 5 | 5 |
| Silane A-187 | | 4 | 6 | 8 | 10 |
| Total | 100 | 104 | 106 | 108 | 110 |

TABLE 3b-continued

| Recipe | A | 6' | 7' | 8' | 9' |
|---|---|---|---|---|---|
| COMP B ppw | | | | | |
| Modified Polyamine AHEW 95 | 100 | 100 | 100 | 100 | 100 |

Various properties of these formulations are determined:

TABLE 4a

Viscosity (CPS) at 23° C./50% RH - Results of varying content of silane coupling agents

| | C4* | C5* | 6 | 7 | 8 | 9 | C10* |
|---|---|---|---|---|---|---|---|
| comp A | >1000 | >1000 | 975 | 780 | 580 | 440 | >1000 |
| comp. A + B | >1000 | 840 | 780 | 640 | 500 | 460 | >1000 |

TABLE 4b

Viscosity (CPS) at 23° C./50% RH-Results of varying content of silane coupling agents

| Recipe no. | A | 6' | 7' | 8' | 9' |
|---|---|---|---|---|---|
| COMP A | >1000 | >1000 | 760 | 560 | 440 |
| Mixed | >900 | 580 | 470 | 380 | 320 |

TABLE 5

Drying (50% RH) Comp A + B Drying time at 5° C./RH 50% WFT: 350 μm

| 5° C. | C4 | C5 | 6 | 7 | 8 | 9 | C10 |
|---|---|---|---|---|---|---|---|
| T2-Tack free time (hr) | 20.1 | 18.4 | 18.8 | 17.1 | 19.9 | 18.7 | 18.4 |
| T3-Hard dry (hr) | 31.6 | 29.5 | 27.6 | 26.2 | 23.9 | 23.4 | 28.6 |

TABLE 6

Drying (50% RH) Comp A + B Drying time at 10° C./RH 50% WFT: 350 μm

| 10° C. | C4 | C5 | 6 | 7 | 8 | 9 | C10 |
|---|---|---|---|---|---|---|---|
| T2-Tack free time (hr) | 14.1 | 14.1 | 13.8 | 13.2 | 12.4 | 11.5 | 15.2 |
| T3-Hard dry (hr) | 20.1 | 18.8 | 17.3 | 16 | 15.2 | 14 | 22.3 |

TABLE 7

Drying (50% RH) Comp A + B Drying time at 23° C./RH 50% WFT: 350 μm

| 23° C. | C4 | C5 | 6 | 7 | 8 | 9 | C10 |
|---|---|---|---|---|---|---|---|
| T2-Tack free time(hr) | 9.4 | 9.1 | 8.3 | 7.9 | 7.4 | 7.1 | 7.5 |
| T3-Hard dry (hr) | 11.8 | 11.5 | 9.9 | 10.7 | 9.4 | 9.4 | 10.2 |

The silane coupling agents contribute to shorter drying times and increasing levels have a more pronounced effect.

The drying times are a little longer than commonly used solvent born Universal Primers, but as a single coat system the total application time of the system will be dramatically reduced.

Increasing amounts of Silane A-187 (epoxy functional silane) reduces the viscosity of the paint (See Recipes C4 to 9 and 6' to 9').

Effect of Epoxy Reactive Diluent

TABLE 8

| Material Name | EWW | Recipe C11* | Recipe 12 | Recipe 13 | Recipe 14 | Recipe 15 |
|---|---|---|---|---|---|---|
| Comp. A ppw | | | | | | |
| BPF liquid epoxy | 172 | 40 | 30 | 30 | 30 | 30 |
| 1,6-HDDGE | 150 | | 10 | | | |
| Neopentyl glycol diglycidyl ether | 138 | | | 10 | | |
| NC-513 | 490 | | | | 10 | |
| p-TBPGE | 225 | | | | | 10 |
| SILANE A-187 | 236 | 5 | 5 | 5 | 5 | 5 |
| EPODIL LV5 | | 5 | 5 | 5 | 5 | 5 |
| TIO2 Universal | | 10 | 10 | 10 | 10 | 10 |
| BaSO4 | | 39 | 39 | 39 | 39 | 39 |
| Crayvallac Ultra | | 1 | 1 | 1 | 1 | 1 |
| Comp. B AHEW | | | | | | |
| Modified Polyamine AHEW 95 | 95 | 100 | 100 | 100 | 100 | 100 |

*comparative

TABLE 9

| Viscosity (CPS) at 23° C./50% RH | | | | | |
|---|---|---|---|---|---|
| | Recipe C11* | Recipe 12 | Recipe 13 | Recipe 14 | Recipe 15 |
| Comp.A | >1000 | 460 | 500 | 615 | 560 |
| comp.A + B | 740 | 360 | 380 | 480 | 420 |

*comparative

Aliphatic diluents are preferred as they contribute to the flexibility of the coating. A difunctional reactive diluent will be preferred to a monofunctional as it speeds up the drying speed and the increased crosslinking density contributes to better anticorrosive properties.

TABLE 10

| Drying time result [T2 = tack free time/T3 = hard dry hrs] | | | |
|---|---|---|---|
| Recipe no. | C11* | 12 | 14 |
| 5° C./50% RH | 19/25 | 25/37 | 29/38 |
| 23° C./50% RH | 7/8 | 8/9 | 9/10 |

In examples C11 to 14, C11 is fastest to dry due to the absence of reactive diluent and example 12, which contains di-functional reactive diluent, has a faster drying time than example 14, which contains mono-functional reactive diluent.

TABLE 11

| Elongation test | | | |
|---|---|---|---|
| | C11* | 12 | 14 |
| Elongation [%] | Crack | 15 | 19 |

Pot Life at 23° C./50% RH

TABLE 12a

| | A | C4* | C5* | 6' | 7' | 8' | 9' |
|---|---|---|---|---|---|---|---|
| Pot life [min] | 90 | 105 | 105 | 105 | 120 | 135 | 135-150 |

TABLE 12b

| | C11* | 12 | 13 | 14 | 15 |
|---|---|---|---|---|---|
| Pot life [min] | 90 | 90 | 105 | 135 | 135 |

Based on test results, a reduced initial viscosity is important to ensure a longer pot life time. Higher silane content also tends to increase pot life time.

Effect of Hydrocarbon Resin

TABLE 13

| Material Name | EEW | C16* | 17 | 18 | 19 | 20 | 21 | 22 | 23 |
|---|---|---|---|---|---|---|---|---|---|
| Comp. A ppw | | | | | | | | | |
| BPF liquid Epoxy | 172 | 40 | 40 | 40 | 40 | 40 | 40 | 40 | 40 |
| NC-513 | 490 | 5 | 5 | 5 | 5 | 5 | 5 | 5 | 5 |
| TIO2 Universal | | 10 | 10 | 10 | 10 | 10 | 10 | 10 | 10 |
| BaSO4 | | 39 | 34 | 32 | 29 | 34 | 34 | 34 | 34 |
| Crayvallac Ultra | | 1 | 1 | 1 | 1 | 1 | 1 | 1 | 1 |
| SILANE A-187 | 236 | 5 | 5 | 5 | 5 | 5 | 5 | 5 | 5 |
| Epodil LV5 | | 0 | 5 | 7 | 10 | | | | |
| Novares LC15 | | | | | | 5 | | | |
| Novares LS500 | | | | | | | | | |
| Comp. A ppw | | | | | | | | | |
| Novares TL10 | | | | | | | 5 | | |
| Novares LR600 | 295 | | | | | | | 5 | |
| Enovik Albidur EP 2240 | 300 | | | | | | | | 5 |
| Comp. B AHEW | | | | | | | | | |
| Modified Polyamine AHEW 95 | 95 | 100 | 100 | 100 | 100 | 100 | 100 | 100 | 100 |

*comparative

Types of Hydrocarbon and Alternatives

1. Epodil LV5: OH Content (0%), formaldehyde with 1,3-dimethylbenzene
2. Novares LC15: OH Content (1.5%), phenol modified hydrocarbon
3. Novares LS500: OH Content (7.3%), phenol modified hydrocarbon
4. Novares TL10: OH Content (0%), C9 hydrocarbon
5. Novares LR600: OH Content (0%), epoxy functionalized hydrocarbon, EEW=295
6. Evonik Albidur EP2240: epoxy functionalized silicone rubber, EEW=300

TABLE 14

| Viscosity (CPS) at ambient conditions (23° C./50% RH) | | | | | | | | |
|---|---|---|---|---|---|---|---|---|
| | C16* | 17 | 18 | 19 | 20 | 21 | 22 | 23 |
| comp A | >1000 | 850 | 810 | 700 | 930 | >1000 | 950 | >1000 |
| comp. A + B | 720 | 600 | 560 | 490 | 640 | 680 | 620 | 740 |

TABLE 15

| Pot life at 23° C./50%RH | | | | | | | | |
|---|---|---|---|---|---|---|---|---|
| | C16* | 17 | 18 | 19 | 20 | 21 | 22 | 23 |
| Pot life [min] | 60 | 75 | 75 | 120 | 100 | 95 | 105 | 120 |

*comparative

Increasing amount of hydrocarbon resin leads to an increased potlife.

Increasing amounts of Epodil LV5 reduces the viscosity in both Comp. A and in the mixture of comp. A+Comp B.

Epodil Lv-5 seems to give more effect than other hydrocarbon resins. Novares LR600 (Recipe 8) was closest in viscosity reduction.

Some general properties of the recipes of the invention are presented below:

TABLE 16

| | Recipe | | | | | |
|---|---|---|---|---|---|---|
| Property | A | C4* | C5* | 6' | 7' | 8' |
| Cathodic disbondment | 3 | 2 | 2 | 1 | 1 | 1-2 |
| Sea water resistance | 3 | 3 | 3 | 2 | 2 | 2 |
| Weight solid [%] | 100 | 100 | 100 | 100 | 100 | 100 |
| Volume solid [%] | 100 | 100 | 100 | 100 | 100 | 100 |
| VOC [g/l] | 0 | 0 | 0 | 0 | 0 | 0 |
| PVC | 15 | 14 | 14 | 14 | 13 | 13 |
| Amine/Epoxy ratio | 1 | 1 | 1 | 1 | 1 | 1 |
| Silane content [wt %] | 0 | 0.4 | 1.6 | 3.1 | 4.6 | 6.0 |

Higher silane content in coating composition improves sea water resistance and there is an optimal silane content for cathodic disbondment.

As used herein, the term "pigment volume concentration" (PVC) refers to the ratio of the volume of the pigment or filler particles (i.e. non-binder solids) to the total volume of solids (binder and filler) present in the first coating composition. Where the binder and non-binder solids include multiple components, ideal mixing is assumed and all volumes are additive.

TABLE 16

| Recipe | C11* | 12 | 14 |
|---|---|---|---|
| Property | | | |
| Cathodic disbandment | 2 | 1 | 3 |
| Sea water resistance (blasted) | 1 | 1 | 2 |
| Sea water resistance (grinded) | 2 | 1 | 2 |
| Weight solid [%] | 100 | 100 | 100 |
| Volume solid [%] | 100 | 100 | 100 |
| VOC [g/l] | 0 | 0 | 0 |
| PVC | 1 | 14 | 15 |
| Amine/Epoxy ratio | 1 | 1 | 1 |
| Silane content [wt %] | 4.0 | 4.0 | 4.1 |

The use of a difunctional diluent improves sea water resistance relative to a monofunctional diluent.

TABLE 17

| Chemical resistance in Xylene | | | |
|---|---|---|---|
| Immersion period | C11* | 12 | 14 |
| 1 hour | G | G | EW |
| 2 hours | G | G | EW |
| 3 hours | G | G | P |
| 4 hours | G | G | |
| 8 hours | G | G | |
| 24 hours | G | EW | |

TABLE 18

| Chemical resistance in Methyl Isobutyl ketone (MIBK) | | | |
|---|---|---|---|
| Immersion period | C11* | 12 | 14 |
| 1 hour | G | G | G |
| 2 hours | G | G | EW |
| 3 hours | G | G | EW |
| 4 hours | G | G | P |
| 8 hours | G | G | |
| 24 hours | G | EW | |

G: Good condition
EW: Edge wrinkling,
P: Peel-off, B: Blisterings

Difunctional reactive diluent improves chemical resistance compared to monofunctional reactive diluent. C11, which does not contain any reactive diluents, has best chemical resistance. When comparing di-(ex 12) to monofunctional diluent (ex 14) recipe, di-function reactive diluent recipe (ex 12) is superior.

Additional comparative Example C24 based on Example 18 of WO2006/016625

TABLE 19

| Material name | | ppw |
|---|---|---|
| Comp A | | |
| BPA liquid epoxy EEW 190, NV 100% | Binder | 42.9 |
| EPODIL 759 | Reactive diluent | 13.0 |
| M-CURE 400 | Acrylic monomer | 2.6 |
| Potash feldspar K-325 | Filler | 22.9 |
| $BaSO_4$ | Filler | 2.0 |
| TiO2 | Filler | 7.0 |
| (3-glycidoxypropyl) trimethoxysilane | Epoxy silane coupling agent | 1.4 |
| A-S-A T-250F | Rheology agent | 2.6 |
| SUZORITE MICA 200-HK | Filler | 5.3 |
| Benzyl alcohol | High boiling solvent | 0.3 |
| Total | | 100 |
| Comp B | | |
| Sunmide NB-905 NBDA Adduct (29 wt % benzyl alcohol) | Curing agent | 22.0 |
| Nevoxy EPX-L2 from Neville | Petroleum resin | 27.0 |
| Ancamine K-54 | Tertiary amine | 0.68 |
| Potash feldspar K-325 | Filler | 27.97 |
| $BaSO_4$ | Filler | 10.25 |
| Carbon black | Pigment | 0.1 |
| A-S-A T-250F | Rheology agent | 1.0 |
| SUZORITE MICA 200-HK | Filler | 4.0 |
| Benzyl alcohol | High boiling solvent | 7.0 |
| Total | | 100 |

TABLE 19-continued

| Material name | ppw |
|---|---|
| Property | |
| Weight solid [%] | 93.6 |
| Volume solid [%] | 91.0 |
| VOC [g/l] | 90.1 |
| Amine/Epoxy ratio | 0.79 |
| Silane content [wt %] | 0.7 |

The same tests as above were carried out on this example (called C24):

TABLE 20

| Viscosity (CPS) at ambient conditions (23° C./50% RH) | |
|---|---|
| Recipe | C24 |
| COMP A | >1000 |
| Mixed | 870 |

TABLE 21

| Drying time result [T2 = tack free time/T3 = hard dry hrs] | |
|---|---|
| Recipe no. | C24 |
| 5° C./50% RH | 15/23 |
| 23° C./50% RH | 3/4 |

TABLE 22

| Pot life at 23° C./50% RH | |
|---|---|
| Recipe no. | C24 |
| Pot life [min] | 20 |

TABLE 23

| Chemical resistance | | |
|---|---|---|
| Immersion period | C24 in Xylene | C24 in MIBK |
| 1 hour | þ | þ |

Testing was stopped after 1 hour because the sample blistered

TABLE 24

| | C24 |
|---|---|
| Cathodic disbondment | 3 |
| Sea water resistance (blasted steel) | 3 |
| Sea water resistance (ground steel) | 3 |
| Weight solid [%] | 93.6 |
| Volume solid [%] | 91.0 |
| VOC [g/l] | 90.1 |
| PVC | 7.3 |
| Amine/Epoxy ratio | 0.79 |
| Silane content [wt %] | 0.7 |

The invention claimed is:

1. An ultra-high solids content primer coating composition comprising:

(i) 5.0 to 50 wt % based on the total weight of the composition of at least one bisphenol F epoxy resin;

(ii) 1.5 to 12 wt % based on the total weight of the composition of at least one silane;

(iii) 0 to 20 wt % based on the total weight of the composition of at least one hydrocarbon resin;

(iv) 1.0 to 15 wt % based on the total weight of the composition of at least one polyfunctional reactive diluent; and (v) at least one curing agent;

wherein said composition has a solids content of at least 90 wt % measured according to ASTM D5201-05;

wherein said composition has a viscosity of 200 to 800 cps at 23° C. and 50% RH (ASTM D4287); and wherein the ratio between active hydrogen equivalents in the curing agent and epoxy equivalents of the coating composition is in the range 50:100 to 120:100.

2. The ultra-high solids content primer coating composition as claimed in claim 1 comprising:

(i) 5.0 to 50 wt % based on the total weight of the composition of at least one bisphenol F epoxy resin;

(ii) 1.5 to 12 wt % based on the total weight of the composition of at least one silane;

(iii) 0.5 to 20 wt % based on the total weight of the composition of at least one hydrocarbon resin;

(iv) 1.0 to 15 wt % based on the total weight of the composition of at least one polyfunctional reactive diluent; and (v) at least one curing agent;

wherein said composition has a solids content of at least 90 wt % measured according to ASTM D5201-05;

wherein said composition has a viscosity of 200 to 800 cps at 23° C. and 50% RH (ASTM D4287); and wherein the ratio between active hydrogen equivalents in the curing agent and epoxy equivalents of the coating composition is in the range 50:100 to 120:100.

3. The coating composition as claimed in claim 1 wherein said composition has viscosity of 300-600 cps at 5° C., and 50% RH.

4. The coating composition as claimed in claim 1 wherein the at least one bisphenol F epoxy resin (i) has an epoxy equivalent weight of 300 or less.

5. The coating composition as claimed in claim 4 wherein the at least one bisphenol F epoxy resin (i) has an epoxy equivalent weight of 100 to 300.

6. The coating composition as claimed in claim 1 wherein the at least one silane is an epoxy functional silane.

7. The coating composition as claimed in claim 6 wherein the epoxy functional silane is GLYMO.

8. The coating composition as claimed in claim 1 wherein said composition has a solvent content of less than 5 wt %.

9. The coating composition as claimed in claim 1 wherein the composition comprises 2.0 to 10 wt %, based on the total weight of the composition, of the at least one silane (ii) and/or 2 to 10 wt %, based on the total weight of the composition, of the at least one hydrocarbon resin (iii).

10. The coating composition as claimed in claim 1 wherein the at least one polyfunctional reactive diluent (iv) is 1,6-hexanediol diglycidyl ether or 1,4-butanediol diglycidyl ether.

11. The coating composition as claimed in claim 1 wherein coating composition has a solids content of at least 95%.

12. The coating composition as claimed in claim 1 wherein the at least one curing agent is phenalkamine or is a polyamine.

13. The coating composition as claimed in claim 1 wherein the at least one polyfunctional reactive diluent (iv) has a viscosity of 50 cPs or less.

14. The coating composition as claimed in claim 1 wherein the at least one polyfunctional reactive diluent (iv) is a difunctional aliphatic reactive diluent.

15. The coating composition as claimed in claim 1 having a pot life at 23° C. of more than 70 minutes.

16. The coating composition as claimed in claim 1 having a cone and plate viscosity below 500 cPs measured at 23° C.

17. The coating composition as claimed in claim 1 having a VOC of 100 g/L or less.

18. A kit for forming the coating composition as claimed in claim 1 comprising a component (A) and component (B):

wherein component (A) comprises:

(i) at least one bisphenol F epoxy resin;

(ii) at least one silane;

(iii) optionally of at least one hydrocarbon resin; and (iv) at least one polyfunctional reactive diluent;

and a component (B) comprises at least one curing agent (v), wherein (i), (ii), (iii), and (iv) are present in component (A) and (v) is present in component (B) in amounts yielding the coating composition containing 5.0 to 50 wt % of (i), 1.5 to 12 wt % of (ii), 0 to 20 wt % of (iii) and 1.0 to 15 wt % of (iv), based on the total weight of the composition, along with the ratio of active hydrogen equivalents to epoxy equivalents of 50:100 120:100.

19. The kit as claimed in claim 18 wherein said hydrocarbon resin comprises the reaction product of formaldehyde with 1,3-dimethylbenzene.

20. A metal substrate having coated thereon a coating composition as claimed in claim 1.

21. A metal substrate as claimed in claim 20 wherein there is a single coating on the substrate.

22. A metal substrate as claimed in claim 20 wherein the coating composition forms a film on the substrate which has a dry film thickness of 100-500 μm.

23. A process comprising applying a coating composition as claimed in claim 1 to a substrate by air-spraying or by airless- or airmix-spraying at a pressure of 3 to 5 bars and ambient temperature, optionally without preheating the coating composition before spraying.

* * * * *